(12) United States Patent
Carlini

(10) Patent No.: US 11,536,320 B2
(45) Date of Patent: Dec. 27, 2022

(54) SEAL FOR A CONSTANT VELOCITY JOINT

(71) Applicant: Aircraft Gear Corporation, Loves Park, IL (US)

(72) Inventor: Sean M. Carlini, Rockford, IL (US)

(73) Assignee: Aircraft Gear Corporation, Loves Park, IL (US)

( * ) Notice: Subject to any disclaimer, the term of this patent is extended or adjusted under 35 U.S.C. 154(b) by 0 days.

(21) Appl. No.: 16/817,048

(22) Filed: Mar. 12, 2020

(65) Prior Publication Data

US 2020/0208686 A1 Jul. 2, 2020

Related U.S. Application Data

(63) Continuation of application No. 15/594,760, filed on May 15, 2017, now Pat. No. 10,634,195.

(Continued)

(51) Int. Cl.
*F16D 3/84* (2006.01)
*F16D 3/224* (2011.01)
(Continued)

(52) U.S. Cl.
CPC ............. *F16D 3/848* (2013.01); *F16D 3/224* (2013.01); *F16J 3/042* (2013.01); *F16D 2003/22316* (2013.01)

(58) Field of Classification Search
CPC .......... F16D 3/223; F16D 3/224; F16D 3/843; F16D 3/848; F16D 2003/22316;
(Continued)

(56) References Cited

U.S. PATENT DOCUMENTS 2,074,703 A * 3/1937 Nelson .................... F16D 3/848
464/171
3,260,071 A * 7/1966 Westercamp ........... F16D 3/848
464/173
(Continued)

FOREIGN PATENT DOCUMENTS

DE 3744927 6/1992
DE 3744927 C2 * 6/1992 ............. F16D 3/224
(Continued)

OTHER PUBLICATIONS

U.S. Appl. No. 15/594,760, Nonfinal Office Action, 10 pgs dated May 13, 2019.
(Continued)

*Primary Examiner* — Josh Skroupa
(74) *Attorney, Agent, or Firm* — John V. Daniluck; Dentons Bingham Greenebaum LLP

(57) ABSTRACT

A constant velocity universal joint includes a body which encloses the constant velocity joint components and provides a smooth outer surface. A semi-rigid plastic boot has a spherical surface sized to generally match the outer surface of the body. The material of the boot is sufficiently elastic to allow the boot to fit over the body, yet sufficiently resilient to snap the open end closed after the boot is placed over the body to provide a substantial seal preventing entry of debris under the seal. A retaining ring is positioned on the boot near the truncated end, the ring establishing the location of an elastic seal that contacts the outer surface of the body.

18 Claims, 7 Drawing Sheets

Related U.S. Application Data

(60) Provisional application No. 62/336,471, filed on May 13, 2016.

(51) Int. Cl.
  *F16J 3/04* (2006.01)
  *F16D 3/223* (2011.01)

(58) Field of Classification Search
  CPC .... F16J 3/042; F16J 3/048; F16J 15/52; F16J 15/525; Y10S 464/906; Y10T 403/31; Y10T 403/315
  USPC ..... 464/173–175, 906; 403/50, 51; 277/634, 277/635, 637
  See application file for complete search history.

(56) References Cited

U.S. PATENT DOCUMENTS

| | | | |
|---|---|---|---|
| 3,324,682 A | | 6/1967 | Bendler |
| 4,129,345 A | | 12/1978 | Krude |
| 4,597,745 A | * | 7/1986 | Orian ................ F16D 3/845 464/173 |
| 4,610,559 A | * | 9/1986 | Mayhew ............ F16D 3/848 464/173 |
| 4,627,826 A | * | 12/1986 | Juziuk ............... F16D 3/843 464/175 |
| 4,664,393 A | | 5/1987 | Hazebrook |
| 5,007,881 A | * | 4/1991 | Hazebrook .......... F16D 3/848 464/171 |
| 5,026,323 A | | 6/1991 | Fukumura et al. |
| 5,251,916 A | | 10/1993 | Martin et al. |
| 5,346,431 A | * | 9/1994 | Okuyama ........... F16D 3/848 464/173 |
| 5,469,482 A | | 11/1995 | Vandenberg et al. |
| 5,704,838 A | | 1/1998 | Teale |
| 5,725,433 A | | 3/1998 | Kudo et al. |
| 5,802,705 A | | 9/1998 | Carlini |
| D411,668 S | | 6/1999 | Settelmayer, Jr. et al. |
| D445,120 S | | 7/2001 | Parsons |
| 6,361,444 B1 | | 3/2002 | Cheney et al. |
| 6,368,224 B1 | | 4/2002 | Knodle et al. |
| D462,256 S | | 9/2002 | Jaynes |
| 6,536,779 B1 | | 3/2003 | Maughan et al. |
| 6,840,865 B2 | | 1/2005 | Lentini et al. |
| 7,004,842 B2 | | 2/2006 | Fairchild et al. |
| 7,025,684 B2 | | 4/2006 | Frana et al. |
| 7,029,399 B2 | | 4/2006 | Oki et al. |
| 7,229,358 B2 | * | 6/2007 | Carlini .............. F16D 3/843 464/173 |
| 7,377,854 B2 | | 5/2008 | Wormsbaecher |
| 7,632,188 B2 | | 12/2009 | Gleasman et al. |
| D607,912 S | | 1/2010 | Medici |
| 8,162,767 B2 | | 4/2012 | Holzhei |
| 9,470,271 B2 | | 10/2016 | Connor et al. |
| 2005/0056112 A1 | | 3/2005 | Mandau |
| 2006/0040752 A1 | | 2/2006 | Ishijima et al. |

FOREIGN PATENT DOCUMENTS

| | | | | |
|---|---|---|---|---|
| GB | 2218754 | | 11/1989 | |
| GB | 2218754 A | * | 11/1989 | ............ F16D 3/848 |
| WO | 1999020911 | | 4/1999 | |

OTHER PUBLICATIONS

Applicant Response, U.S. Appl. No. 15/594,760, 17 pgs Sep. 5, 2019.

U.S. Appl. No. 15/594,760, Notice of Allowance, 9 pgs Dec. 13, 2019.

* cited by examiner

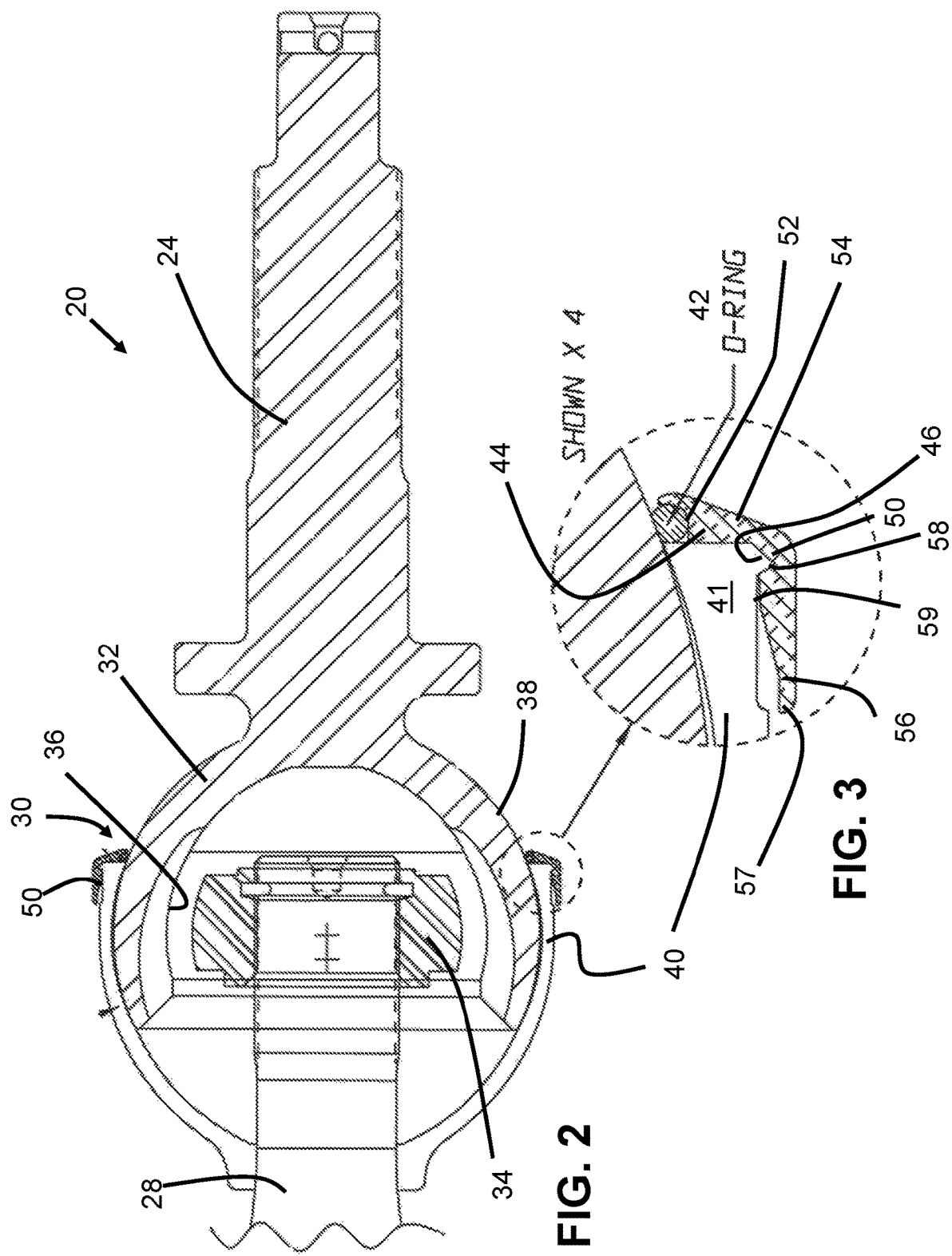

FIG. 5
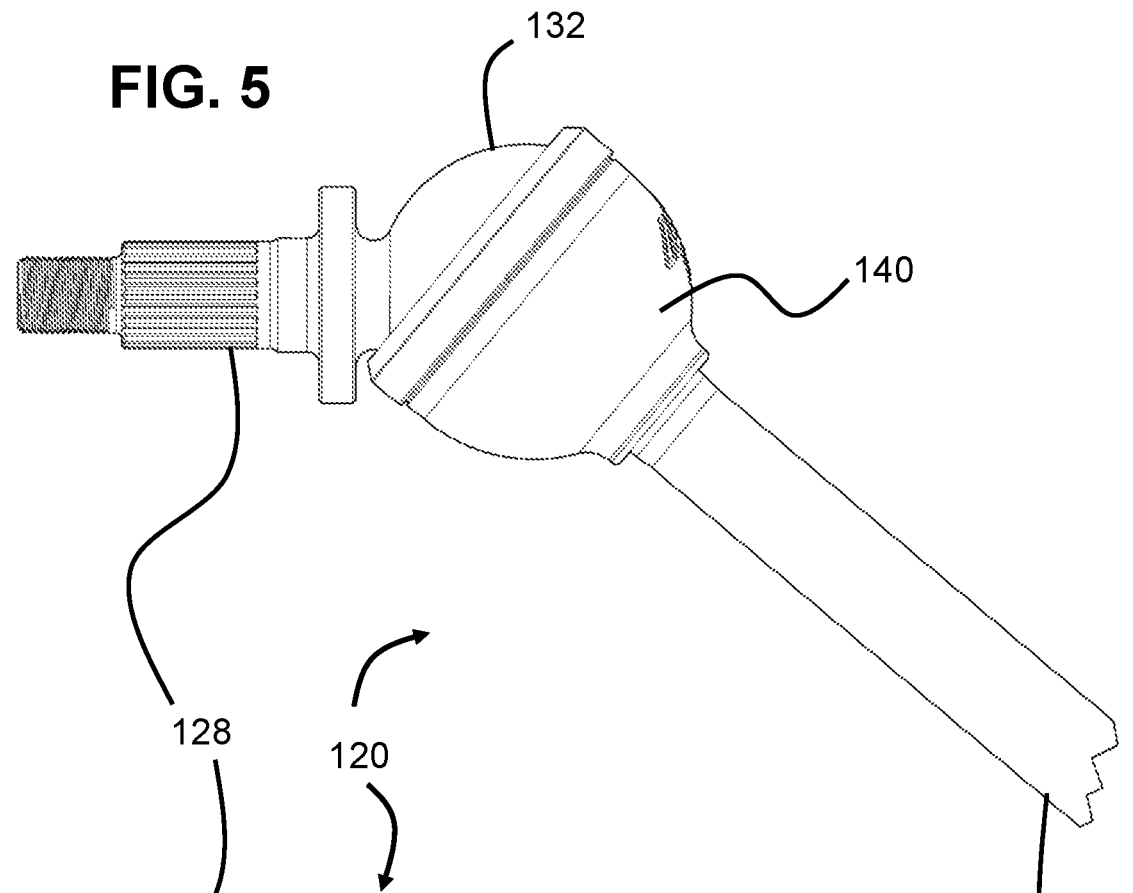
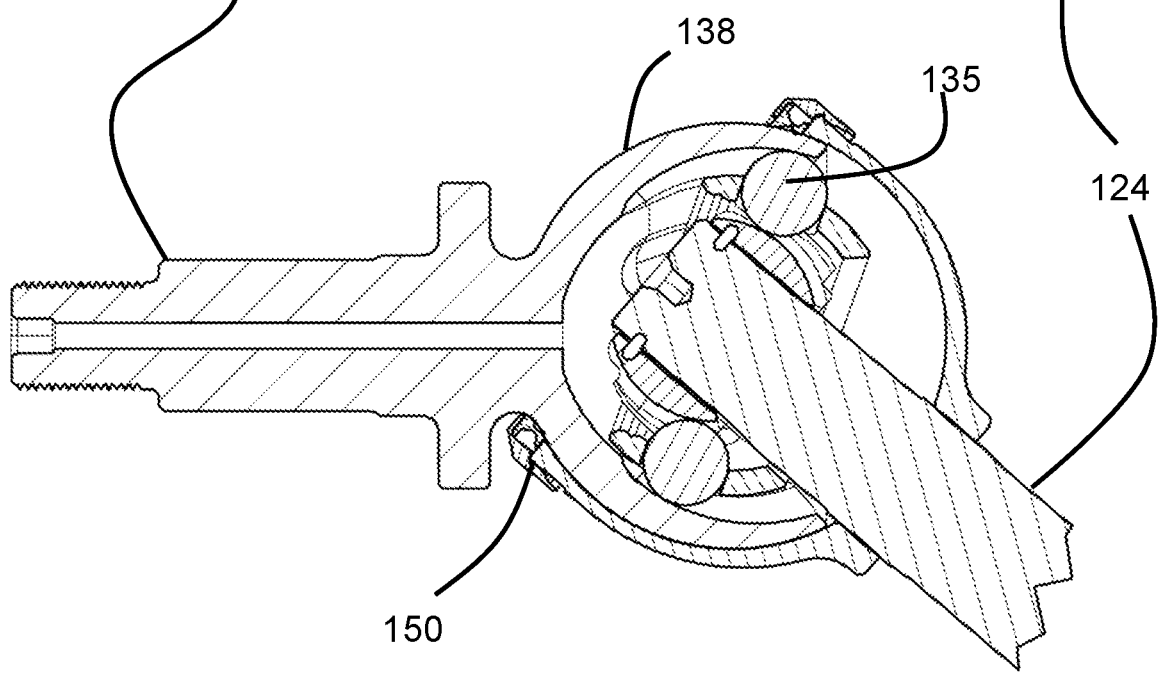
FIG. 6

SEAL FOR A CONSTANT VELOCITY JOINT

CROSS REFERENCE TO RELATED APPLICATIONS

This application is a continuation of U.S. patent application Ser. No. 15/594,769, filed May 15, 2017, which claims the benefit of priority to U.S. Provisional Patent Application Ser. No. 62/336,471, filed May 13, 2016, all of which are incorporated herein by reference.

FIELD OF THE INVENTION

Various embodiments of the present invention pertain to couplings between driving and driven axles, and further to universal joints, and in particular to constant velocity universal joints used to transmit power in land, air, or sea vehicles.

BACKGROUND OF THE INVENTION

Constant velocity joints are used in numerous vehicular applications where the rotational velocity oscillation of a conventional cardan joint is unacceptable. For example, in the front suspension of a front wheel drive automobile, there will be two constant velocity joints per axle. They are also used in off-road heavy-duty equipment, in trucks, and in high performance recreation vehicles.

When the application is not overly environmentally adverse, constant velocity joints are excellent. However, in environmentally unfriendly applications they are less desirable because of the problems of keeping dirt and debris out of the joint. A better understanding of that will be appreciated upon review of FIG. 1 which shows a prior art constant velocity joint.

In the normal automotive environment a seal of this type can protect the joint for many thousands of miles of operation. It is not, like in conventional cardan joints, a simple secondary dust shield, but is the primary seal for keeping foreign material out of the workings of the joint mechanism. Thus, when the seal fails, it is not long thereafter, without attention, that the joint will fail.

It is desirable to use constant velocity joints in more environmentally demanding applications, and the ability of the seal to withstand tough environmental conditions is a strong factor. In off the road applications, for example, rocks and debris thrown up by the tires, or over which the vehicle can skid are readily available to damage the seal.

For other recreational applications, such as four wheel drive vehicles, all-terrain vehicles, rock climbers, and the like where the universal joints are flexed to their limits because of the uneven nature of the terrain, the constant velocity joints will also be a benefit. But again, there is also the possibility of wearing the seal with almost certain failure of the joint to follow, particularly when running through sand, water, and the like.

What will be shown and described herein are various novel and nonobvious improvements to seals for universal joints.

SUMMARY OF THE INVENTION

Some aspects of the present invention pertain to adapting a universal velocity joint to a more hostile environment by providing a more reliable primary seal than has heretofore been provided.

Yet other aspects pertain to making the seal relatively inexpensive, simple to install, and easy to maintain and having a significant flexing capability, on the order of 40 degrees.

Yet another aspect of various embodiments pertains to their usage on various road-way vehicles (cars, trucks, buses), off-road vehicles (ATVs, motorcycles), and aircraft (both for providing propulsive power and for powering accessories), and water vehicles.

Still further descriptions of various embodiments of the present invention can be found in the paragraphs X1 through Xn (and including the paragraphs that modify these paragraphs X1 through Xn) located toward the end of the specification.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

FIG. 2 is a scaled cross sectional line drawing of a constant velocity joint assembly according to one embodiment of the present invention.

FIG. 3 is an enlargement of a portion of the assembly shown in FIG. 2.

FIG. 5 is an external side view of a constant velocity joint according to another embodiment of the present invention.

FIG. 6 is a cutaway of the apparatus of FIG. 5.

ELEMENT NUMBERING

Figure 1:
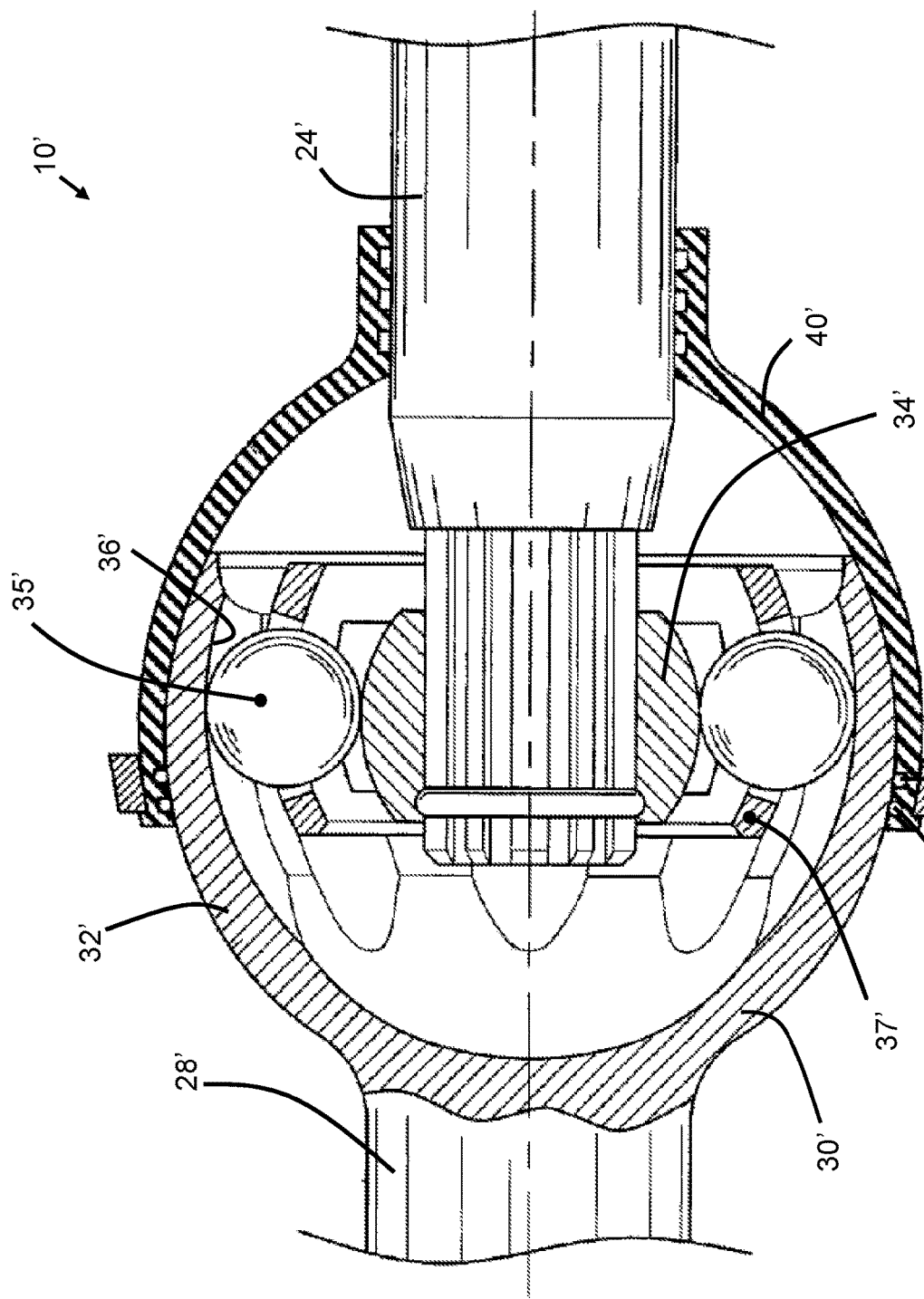
FIG. 1 is a cross sectional line drawing of a prior art constant velocity joint assembly.

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety.

| | |
|---|---|
| 10 | prior art assembly |
| 11 | ring |

-continued

| | |
|---|---|
| 12 | seals |
| 20 | CV joint assembly |
| 24 | output shaft |
| 28 | input shaft |
| 29 | splines |
| 30 | constant velocity joint |
| 31 | |
| 32 | body |
| 33 | |
| 34 | inner race |
| 35 | drive balls |
| 36 | body races |
| 37 | cage |
| 38 | outer surface |
| 39 | |
| 40 | semi-rigid plastic boot |
| 41 | open end |
| 42 | O-ring |
| 43 | |
| 44 | front face |
| 45 | |
| 46 | exterior corner; complementary-shaped fitment; ridge; ledge; pocket; depression |
| 50 | retaining ring |
| 51 | |
| 52 | groove, pocket, recess; chamber |
| 53 | |
| 54 | sealing leg |
| 55 | |
| 56 | leading leg |
| 57 | leading edge |
| 58 | interior corner; complementary-shaped fitment; ridge; ledge; pocket; depression |
| 59 | ramp |
| 60 | seal |
| 61 | spring cavity |
| 62 | energizing spring |
| 63 | |
| 64 | wiping surface |
| 65 | wiping leg |
| 66 | compression faces |
| 67 | |
| 68 | flexible section |

DETAILED DESCRIPTION OF ONE OR MORE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments, it therefore bein4g understood that use of the word "prefe4rably" implies the term "optional."

The use of an N-series prefix for an element number (NXX.XX) refers to an element that is the same as the non-prefixed element (XX.XX), except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology. Further, it is understood that the features 1020.1 and 20.1 may be backward compatible, such that a feature (NXX.XX) may include features compatible with other various embodiments (MXX.XX), as would be understood by those of ordinary skill in the art. This description convention also applies to the use of prime ('), double prime ("), and triple prime ("') suffixed element numbers. Therefore, it is not necessary to describe the features of 20.1, 20.1', 20.1", and 20.1'" that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Various references may be made to one or more methods of manufacturing. It is understood that these are by way of example only, and various embodiments of the invention can be fabricated in a wide variety of ways, such as by casting, sintering, sputtering, welding, electrodischarge machining, milling, as examples. Further, various other embodiment may be fabricated by any of the various additive manufacturing methods, some of which are referred to 3-D printing.

This document may use different words to describe the same element number, or to refer to an element number in a specific family of features (NXX.XX). It is understood that such multiple usage is not intended to provide a redefinition of any language herein. It is understood that such words demonstrate that the particular feature can be considered in various linguistical ways, such ways not necessarily being additive or exclusive.

FIG. 1 presents a cutaway line drawing of a constant velocity joint assembly 10' according to a prior art design. This joint 10 is further described in U.S. Pat. No. 7,229,358, issued Jun. 12, 2007, and incorporated herein for description of the operation of a constant velocity joint. An input shaft 28' is coupled to an output shaft 24' by means of the constant velocity joint 30'. CV joint 30' includes an outer raceway 36 comprising a plurality of individual ball races. Torque is supplied through the raceway 35' to individual ball races of an inner raceway 34' that is coupled at an inner diameter by splines to output shaft 24'. A semi-rigid boot 40' provides sealing coverage of CV joint 30' extending from the spherical shape of body 32' to the cylindrical outer diameter of output shaft 24'.

In the FIG. 1 embodiment an outer housing or body 32' of particular configuration encloses the remaining elements of the constant velocity joint 10'. The body has an inner race 34', outer race 38', drive balls 35' and a cage 37'. The inner race 34' has a splined opening to receive the splined end 29' of the output shaft 28'. Thus, the shaft 24' can flex at any angle with respect to the input shaft 28'. The maximum angle which can be accommodated without interference is on the order of 40 degrees.

The outer surface 38' of the body 32' is formed as a smooth spherical surface. A semi-rigid plastic boot 40' is provided. The boot has a smooth internal spherical surface which is sized to match the spherical outer surface of the body. By matching the outer surface is meant that when the boot is snapped into place over the body, a sliding fit is provided between the mating spherical surfaces so that one shaft can move angularly with respect to the other while the boot simply slides over the spherical surface of the body to maintain a seal.

FIGS. 2-10 depict various views of CV assemblies 20 and 120 according to various embodiments of the present invention. A generally consistent element numbering system is used to describe assemblies 20 and 120, as noted above. It is further understood that a prime (') designation as used with FIG. 1 refers to the prior art design CV joint assembly 10', although those of ordinary skill in the art will recognize that portions of the narrative pertaining to CV joint assembly 10' pertain also to basic operation of CV joint assemblies 20 and 120, although not with respect to sealing.

Figure 4:
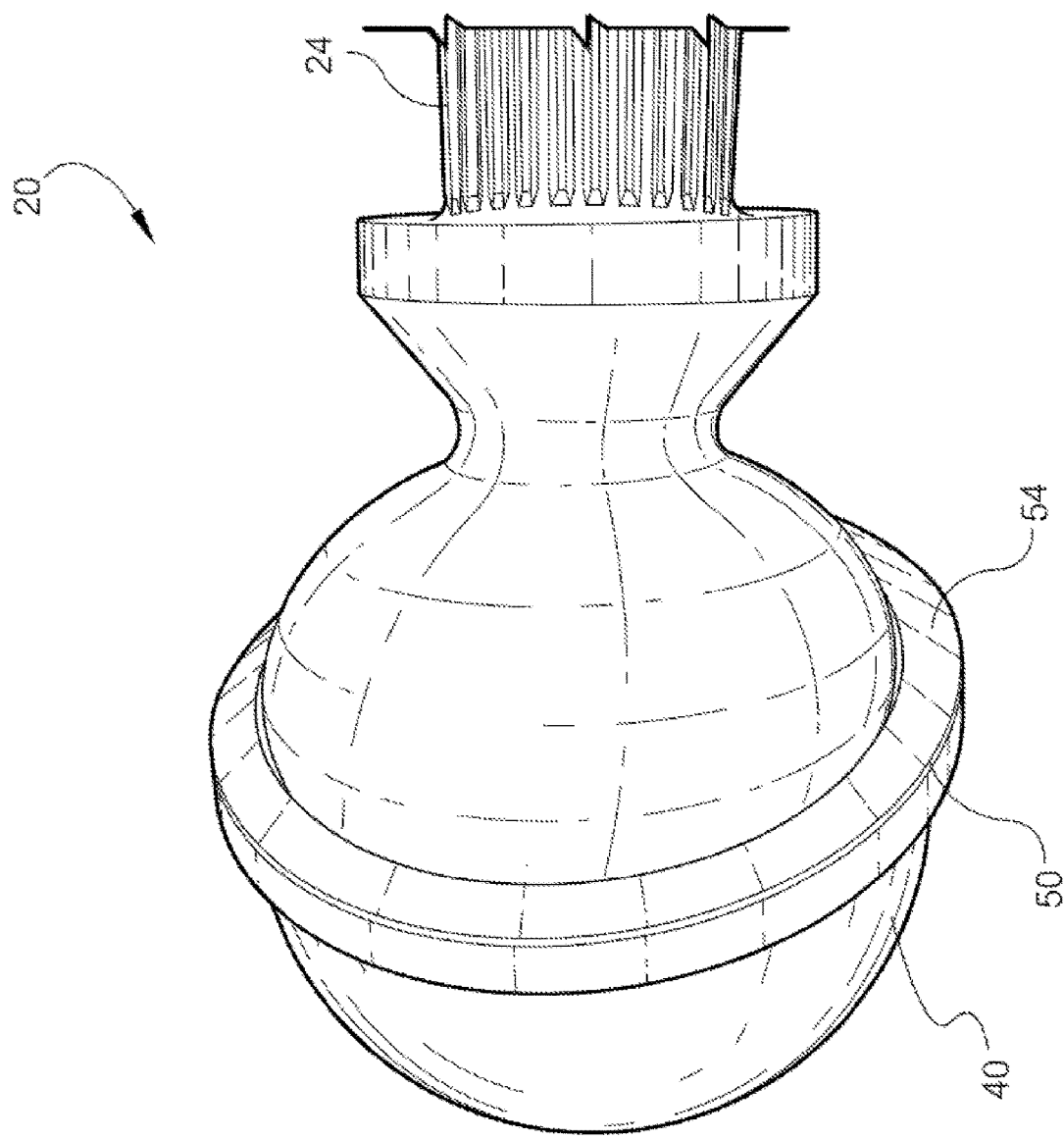
FIG. 4 is a photographic representation of a constant velocity joint according to another embodiment of the present invention.

FIGS. 2-4 show various views of a constant velocity joint assembly 20 according to one embodiment of the present invention. Assembly 20 comprises an input shaft 24 receiving power from a motive source (not shown), and output shaft 28 that provides the power to driven component (not shown), and a constant velocity joint 20 that operatively couples shaft 24 to shaft 28. In at least one embodiment, the assembly 20 is one of a pair of assemblies in a vehicle such as a car, bus, truck or similar vehicle, as used on roadways, off-road, or in racing applications. In such embodiments, the motive source is typically a gear assembly driven by a motor, and the driven component is a wheel.

The assembly 20 permits the smooth transfer of power as the motive source and the driven component change their relative spatial orientation. The input shaft provides power to input shaft 24, to which is coupled by way of splines and a lock ring to an inner race 34. The output shaft 28 includes a section of a spherical body 32 that includes an outer race 36. A plurality of bearings (not shown) are in contact with both inner race 34 and outer race 36. By way of various driving features on one or more of the races a power input from the input shaft is provided through the inner race to the bearings, and from the bearings to the outer race. Such transfer is further discussed in U.S. Pat. No. 7,229,358. It is understood that this transfer of power can be accomplished in any manner, and is not limited to the foregoing description.

Body 32 has a generally spherical outer surface 38 that extends axially from the cylindrical portion of the output shaft toward the input shaft, to a location that arches over and around the outer race 36. Assembly 20 further includes a semi-rigid, flexible plastic boot 40 that extends from the cylindrical portion of input shaft 24 in a largely spherical shape. This spherical portion of boot 40 snugly covers the end of shaft 24 and the mid-section of body 32 and provides a means to retain a lubricant within the interior of CV joint 30, and further to protect the inner power transfer mechanisms from dust, dirt, and other contaminants.

The boot 40 includes an opened end 41 that, in conjunction with a retaining ring 50 and O-ring seal 42, provides positive, wiping, sealing protection between the boot 40 and the outer surface 38 of body 32. This sealing is best shown in FIG. 3 and FIG. 5. An L-shaped, one-piece aluminum retaining ring 50 extends around the opened end 41. Ring 50 includes a leading leg 56 and a sealing leg 54 that define between them a corner 58. Inner corner 58 receives within it an exterior corner 46 of boot 40. Leading leg 56 can be seen to have a leading edge 57 that is sized to an inner diameter that is preferably slightly more than the maximum outer diameter of the corner 46 of boot 40. FIG. 5 further shows that both interior corner 58 and exterior corner 46 have shapes that are largely complementary to one another, such that the mating of these two corners provides positive retention of ring 50 on boot 40.

During assembly, boot 40 is placed around the periphery and outer surface 38 of body 30. Ring 50 is then placed from shaft end 28 around the opened end 41 of the boot. The leading edge 57 of leg 56, having a larger diameter, passes relatively easy over the outer corner 46. However, as ring 50 is further pushed toward the input shaft 24, a ramp 59 on the inner surface of leading leg 56 pushes inward against corner 46 and compresses inward the opened end 41 of boot 40. As the assembly continues, the ramped inner surface 59 gives way to the inner corner 58, which provide geometric relief. This relief to the compression is achieved by the inner diameter of the inner corner 58 being greater than the outer diameter of the ramp 59. As the outer corner 46 reaches the relieved inner corner, the compressed outer corner "snaps" into place within the inner corner.

The sealing of boot 40 against the body 32 further includes an O-ring 42. This O-ring is retained with a groove, pocket, or recess 52 formed in the sealing leg 54 of ring 50. When ring 50 is placed into position on boot 40, the ring and boot dimensions are adapted and configured such that the pocket 52 holds O-ring 42 in a sealing position against both the outer surface 38 of body 32, as well as against the front face 44 of boot 40. However, in yet other embodiments, O-ring 42 is held against the outer surface, but not necessarily against the front face.

FIGS. 5-10 show various views of a constant velocity joint assembly 120 according to one embodiment of the present invention. Persons of ordinary skill in the art will note that joint assembly 120 is similar with regards to joint assembly 20 in terms of the transmission of power and speed from the input shaft to the output shaft. Assembly 120 comprises an input shaft 124 receiving power from a motive source (not shown), and output shaft 128 that provides the power to driven component (not shown), and a constant velocity joint 120 that operatively couples shaft 124 to shaft 128.

In at least one embodiment, the assembly 120 is one of a pair of assemblies in a vehicle such as a car, bus, truck or similar vehicle, as used on roadways, off-road, or in racing applications. In such embodiments, the motive source is typically a gear assembly driven by a motor, and the driven component is a wheel. In various other embodiments of the present invention, assemblies 20 and 120 are further useful in other applications, including aircraft, such as for the transmission of power from a gas turbine to a propeller gear box, and further for the transmission of power from an accessory gearbox to a lift fan or other propulsive component, and still further for the rotational powering of accessories, including those that generate electricity, pump fuel, and the like. Still further, various embodiments can find use in sea-going vehicles, whether to provide propulsion, power accessories, or for other reasons.

The assembly 120 permits the smooth transfer of power as the motive source and the driven component change their relative spatial orientation. The input shaft provides power to input shaft 124, to which is coupled by way of splines and a lock ring to an inner race 134. The output shaft 128 includes a section of a spherical body 132 that includes an outer race 136. A plurality of bearings (not shown) are in contact with both inner race 134 and outer race 136. By way of various driving features on one or more of the races a power input from the input shaft is provided through the inner race to the bearings, and from the bearings to the outer race. It is further understood that the universal joints discussed herein can be of the constant velocity type, but further the seal arrangements are useful in any type of universal joint that permits pivoting between a powering shaft and a powered shaft.

Body 132 has a generally spherical outer surface 138 that extends axially from the cylindrical portion of the output shaft toward the input shaft, to a location that arches over and around the outer race 136. Assembly 120 further includes a semi-rigid, flexible plastic boot 140 that extends from the cylindrical portion of input shaft 124 in a largely spherical shape. This spherical portion of boot 40 snugly covers the end of shaft 124 and the mid-section of body 150 and provides a means to retain a lubricant within the interior of CV joint 130, and further to protect the inner power transfer mechanisms from dust, dirt, and other contaminants.

Figure 7:
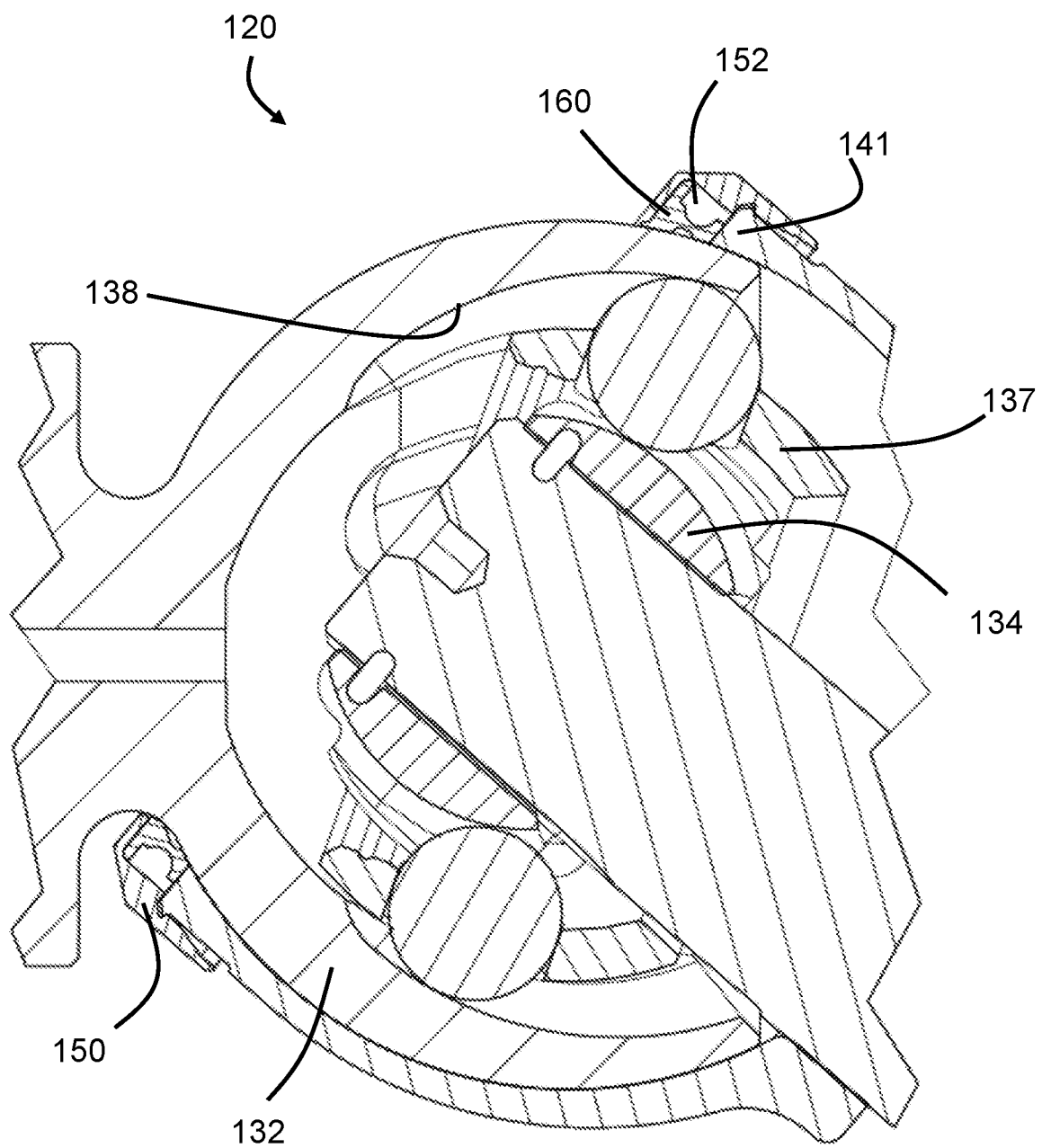
FIG. 7 is an enlarged view of the apparatus of FIG. 6.
Figure 8:
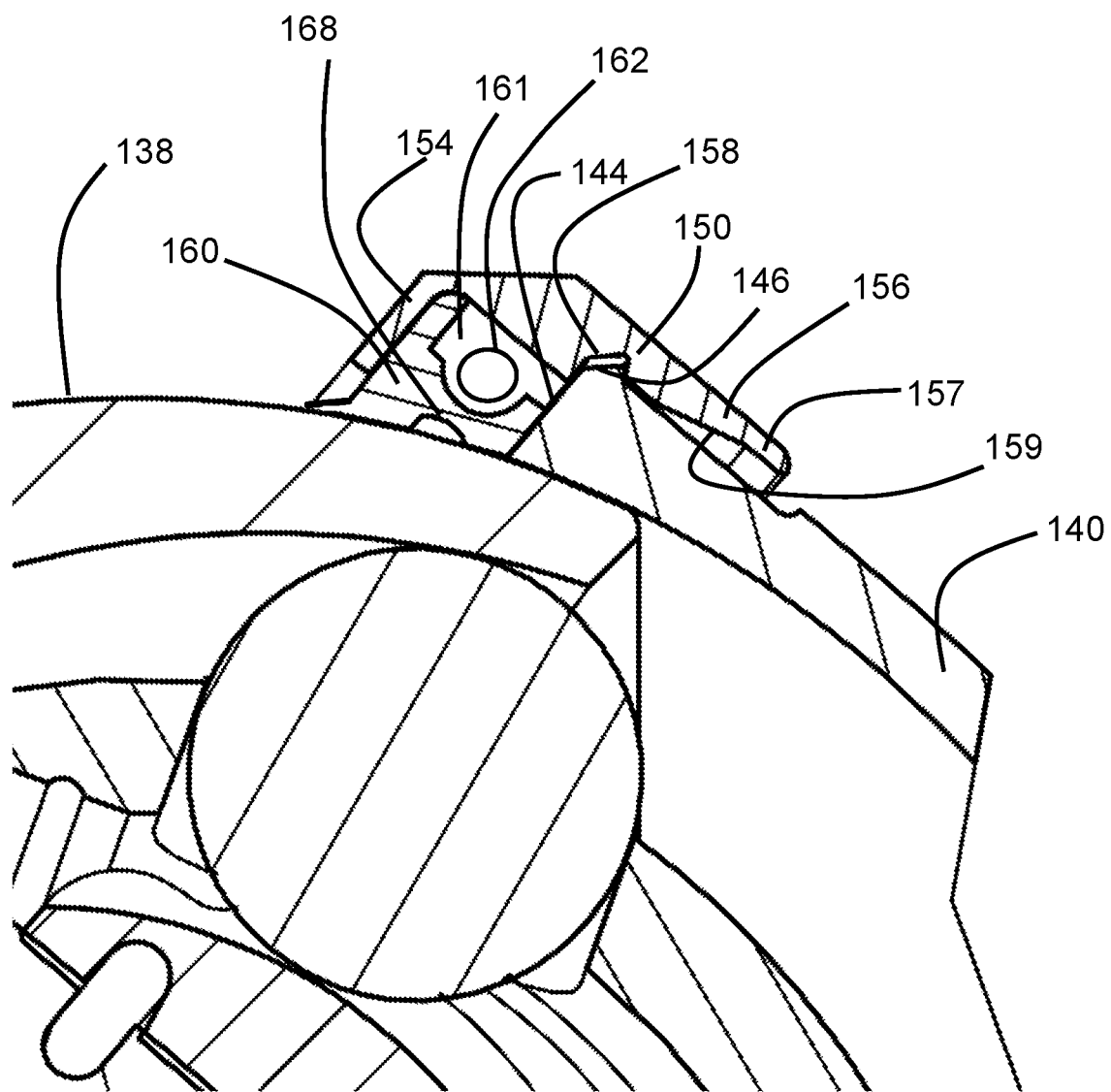
FIG. 8 is an enlargement of a portion of the apparatus of FIG. 7.

The boot 140 includes an opened end 141 that, in conjunction with a retaining ring 150 and seal 160, provides positive, wiping, sealing protection between the boot 140 and the outer surface 138 of body 132. This sealing is best shown in FIG. 7 and FIG. 8. An L-shaped, one-piece aluminum retaining ring 150 extends around the opened end 141. Ring 150 includes a leading leg 156 and a sealing leg 154 that define between them chamber 152. A seal 160 and energizing spring 161 (not shown) are located within chamber 152.

In some embodiments, ring 150 is retained in a location by boot 140 by the interaction of fitments 146 and 158. As best seen in FIG. 8, fitments 158 and 146 are generally complementary in shape. Fitting feature 146 in one embodiment is a ledge or ridge that extends near the front face 144 of the opened end 141 of boot 140. This fitting feature 146 is seen placed within a corresponding, complementary-shaped fitment 158 of ring 150. Ring 150 and boot 140 are retained to one another by the cooperation of features 146 and 158. It is understood that the boot and ring can further be coupled to one another by any means.

Leading leg 156 can be seen to have a leading edge 157 that is sized to an inner diameter that is preferably slightly more than the maximum outer diameter of the front face 144 of boot 140. During assembly, boot 140 is placed around the periphery and outer surface 38 of body 130. Ring 150 is then placed from shaft end 128 around the opened end 141 of the boot. The leading edge 157 of leg 156, having a larger diameter, passes relatively easy over the outer corner 146. However, as ring 150 is further pushed toward the input shaft 124, a ramp 159 on the inner surface of leading leg 156 pushes inward against corner 146 and compresses inward the opened end 141 of boot 140. As the assembly continues, the ramped inner surface 59 gives way to the coupling of boot fitment 146 with ring fitment 158. As the fitment 146 reaches fitment 158, the compressed outer corner "snaps" into place within the inner corner.

Figure 9:
FIG. 9 is a cross sectional end view of a seal and ring assembly according to one embodiment of the present invention.
Figure 10:
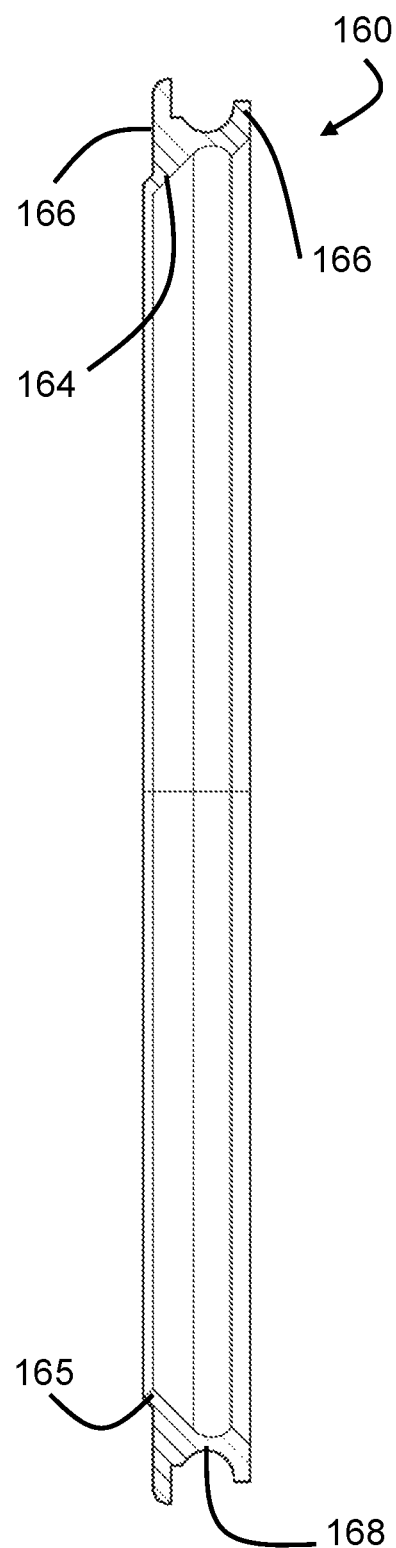
FIG. 10 is a cross sectional side view of a seal according to one embodiment of the present invention.

Referring to FIGS. 8, 9, and 10, a retaining ring 150 and seal 160 can be seen coupled together. Seal 160 is preferably a one piece seal cast from a resilient sealing material, such as polyurethane, silicone rubber, or other elastomeric sealing materials. In some embodiments, the seal is cast into shape, but can also be molded in place into the retaining ring, or extruded, as other examples.

Referring to FIG. 8, it can be seen that seal 160 includes a forward face that abuts against an interior face of sealing leg 154. In some embodiments, the interior face of leg 154 and the corresponding face of seal 160 are bonded together with an adhesive, or by other methods. This forwardmost face of seal 160 extends radially inward toward a lip 165 that acts as a wiping leg of the seal against the outer surface 138 of body 132.

Referring to FIG. 8, it can be seen that ring 150 and boot 140 combine to define a chamber 152 that receives within the assembled seal 160. Preferably, when installed seal 160 is compressed between front face 144 and the inner face of leg 154. FIG. 10 shows the opposing compressed faces 166 of seal 160 in the free (uncompressed) state. In some embodiments seal 160 includes a flexible mid section 168 that effectively divides the sealing surface contacting surface 138 into 2 two wiping portions. further, this flexible section helps manage the stresses internal to the seal as a result of it being compressed in two directions (radially inward against surface 138 by spring 162, and laterally between leg 154 and face 144) and further to provide space to accommodate any swelling due to thermal expansion or fluid absorption.

In some embodiments, seal 160 further includes a spring cavity 160 that receives within it an energizing spring 162. Preferably, spring 162 is a circular, coiled spring and compresses wiping surface 164 against surface 132. However, yet other embodiments do not include an energizing spring.

Various aspects of different embodiments of the present invention are expressed in paragraphs X1, X2, and X3 as follows:

X1. One aspect of the present invention pertains to a universal joint. The universal joint preferably includes an input shaft including body having a first outer surface and an outer raceway, a plurality of ball bearings each located within a corresponding race of said outer raceway, an output shaft coupled to said inner raceway and having a second outer surface. The universal joint preferably includes a semi-rigid boot having a first opened end covering a portion of the first outer surface and a second end covering a portion of the second outer surface proximate to the splines; and a ring that compresses the first opened end against the first outer surface, the ring retaining an O-ring in contact with the first outer surface.

X2. Another aspect of the present invention pertains to a universal joint. The universal joint preferably includes an input shaft including body. The universal joint preferably includes an output shaft coupled to the inner shaft for transmission of power from the input shaft to the output shaft. The universal joint preferably includes a boot having a first opened end sealingly covering a portion of the body and a second end sealingly covering a portion of the output shaft. The universal joint preferably includes a ring coupled to the first opened end of said boot, and a separable resilient seal having a sealing surface in contact with the outer surface of said body.

X3. Another aspect of the present invention pertains to a method for sealing a universal joint. The method preferably includes providing an input shaft and an output shaft coupled together by a universal joint. The method preferably includes covering at least a portion of the universal joint with a flexible boot having a first end in sliding contact with an outer surface of one of the input shaft or the output shaft and a second end in fixed contact with the other of the output shaft or the input shaft. The method preferably includes placing a resilient seal into a chamber of q ring and compressing the resilient seal with the ring into sliding contact with the one of the input shaft or the output shaft.

Yet other embodiments pertain to any of the previous statements X1, X2, or X3, which are combined with one or more of the following other aspects. It is also understood that any of the aforementioned X paragraphs include listings of individual features that can be combined with individual features of other X paragraphs.

Wherein said ring includes a groove, and the O-ring is located partially within the groove.

Wherein the opened end includes an exterior corner, said ring includes an inner corner, and the exterior corner is received within the inner corner in the final assembled position.

Wherein the first opened end includes one of a female or male fitment feature, said ring including the other of the male or female fitment feature, wherein fitting of the boot fitment feature and the ring fitment feature retain said ring in a location on said boot.

Wherein said ring has an L-shaped cross section for fitting around two adjacent surfaces of the first opened end of said boot.

Wherein said ring has an L-shaped cross section and fits onto said boot.

Wherein said ring and the opened end of said boot cooperate to define the chamber.

Wherein said seal is compressed within the chamber.

Wherein each of said ring and said boot include complementary-shaped fitment features for coupling said ring to said boot.

Wherein said seal is bonded to said ring.

Wherein said seal includes a leg extending between said ring and said boot, the leg being adapted and configured for wiping contact with said boot.

Wherein which further comprises a spring located in the cavity and adapted and configured to compress said seal onto the surface of said boot.

Wherein said body is generally spherical and said output shaft is coupled to said inner raceway by splines.

Wherein said compressing is radially inward and the sliding contact is radially inward.

Wherein said compressing is with a spring.

Wherein said compressing is axially against the first end and the sliding contact is radially inward.

Wherein said placing a seal is by adhering the seal into the chamber.

Wherein said placing a seal is by molding the seal into the chamber.

Wherein said placing a ring is by fitting a first feature of the ring with a complementary-shaped second feature of the boot.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A universal joint, comprising:
   a first shaft including a generally spherical body having a first outer surface and an outer raceway within the interior of the body;
   a plurality of ball bearings each located within a corresponding race of said outer raceway and each located within a corresponding race of an inner raceway;
   a second shaft coupled by splines to said inner raceway and having a second outer surface;
   a semi-rigid boot having a first opened end sealingly covering a portion of the first outer surface and a second end sealingly covering a portion of the second outer surface proximate to the splines; and
   a ring that compresses the first opened end against the first outer surface, said ring being adapted and configured to slide over the first opened end of said boot after said boot is placed over the first outer surface, the ring retaining a seal in contact with the first outer surface.

2. The universal joint of claim 1 wherein said ring includes a groove, and the seal is located partially within the groove.

3. The universal joint of claim 1 wherein the opened end includes an exterior corner, said ring includes an inner corner, and the exterior corner is received within the inner corner in the final assembled position.

4. The universal joint of claim 1 wherein the first opened end includes one of a female or male fitment feature, said ring including the other of the male or female fitment feature, wherein fitting of the boot fitment feature and the ring fitment feature retain said ring in a location on said boot.

5. The universal joint of claim 4 wherein said ring has an L-shaped cross section for fitting around two adjacent surfaces of the first opened end of said boot.

6. The universal joint of claim 1 wherein said ring has an L-shaped cross section for fitting around two adjacent surfaces of the first opened end of said boot.

7. A universal joint, comprising:
   a first shaft including a body having a first outer surface and an outer raceway within an interior of the body;
   a plurality of ball bearings each located within a corresponding race of said outer raceway and each located within a corresponding race of an inner raceway;
   a second shaft coupled to said inner raceway and having a second outer surface;
   a semi-rigid boot having a first opened end sealingly covering a portion of the first outer surface and a second end sealingly covering a portion of the second outer surface;
   a ring coupled to the first opened end of said boot, the ring forming part of a chamber;
   a resilient seal located in the chamber and having a sealing surface in contact with the outer surface of said body; and
   a spring located in the chamber and adapted and configured to compress said seal onto the surface of said boot.

8. The universal joint of claim 7 wherein said ring and the opened end of said boot cooperate to define the chamber.

9. The universal joint of claim 8 wherein said seal is compressed within the chamber.

10. The universal joint of claim 7 wherein each of said ring and said boot include complementary-shaped fitment features for coupling said ring to said boot.

11. The universal joint of claim 7 wherein said seal is bonded to said ring.

12. The universal joint of claim 7 wherein said seal includes a leg extending between said ring and said boot, the leg being adapted and configured for wiping contact with said boot.

13. The universal joint of claim 7 wherein said body is generally spherical and said second shaft is coupled to said inner raceway by splines.

14. A method for sealing a universal joint, comprising:
providing an input shaft and an output shaft coupled together by a universal joint;
covering at least a portion of the universal joint with a flexible boot having a first end in sliding contact with an outer surface of one of the input shaft or the output shaft and a second end in fixed contact with the other of the output shaft or the input shaft;
placing a ring over the first end of the flexible boot;
placing a resilient seal into a chamber of the ring; and
compressing the resilient seal with the ring into sliding contact with the one of the input shaft or the output shaft;
wherein said compressing is radially inward and the sliding contact is radially inward, and said compressing is with a spring.

15. The method of claim 14 wherein said compressing is axially against the first end.

16. The method of claim 14 wherein said placing a seal is by adhering the seal into the chamber.

17. The method of claim 14 wherein said placing a seal is by molding the seal into the chamber.

18. The method of claim 14 wherein said placing a ring is by fitting a first feature of the ring with a complementary-shaped second feature of the boot.

* * * * *